United States Patent

[11] 3,548,911

[72] Inventors Grover W. Rye;
Paul E. Helms, Jr., Cuyahoga Falls, Ohio
[21] Appl. No. 789,048
[22] Filed Dec. 31, 1968
[45] Patented Dec. 22, 1970
[73] Assignee The Goodyear Tire & Rubber Company
Akron, Ohio
a corporation of Ohio

[54] BELT FOR BIAS-BELTED TIRE
25 Claims, 3 Drawing Figs.
[52] U.S. Cl. .................................................. 152/359
[51] Int. Cl. .................................................. B10c 1/00
[50] Field of Search .......................................... 152/359

[56] References Cited
UNITED STATES PATENTS
3,311,152  3/1967  Marzocchi et al. ........... 152/359
3,315,722  4/1967  Marzocchi et al. ........... 152/359

Primary Examiner—Arthur L. La Point
Assistant Examiner—Richard A. Bertsch
Attorneys—F. W. Brunner and Jack M. Young ABSTRACT: A bias-belted tire having specified tire belt cord physical characteristics of minimum, preferred and/or maximum belt weights, especially when used in a bias-belted tire with fiber glass belt cords, polyester carcass cords, and specified cord angles and relationships.

PATENTED DEC 22 1970 3,548,911
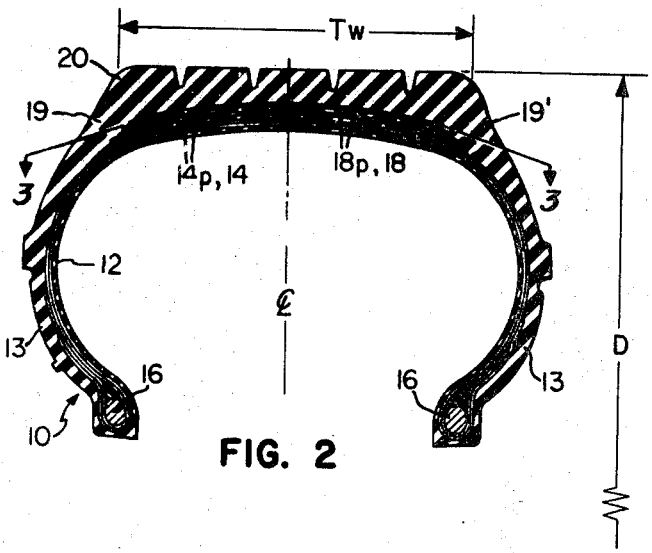
FIG. 2
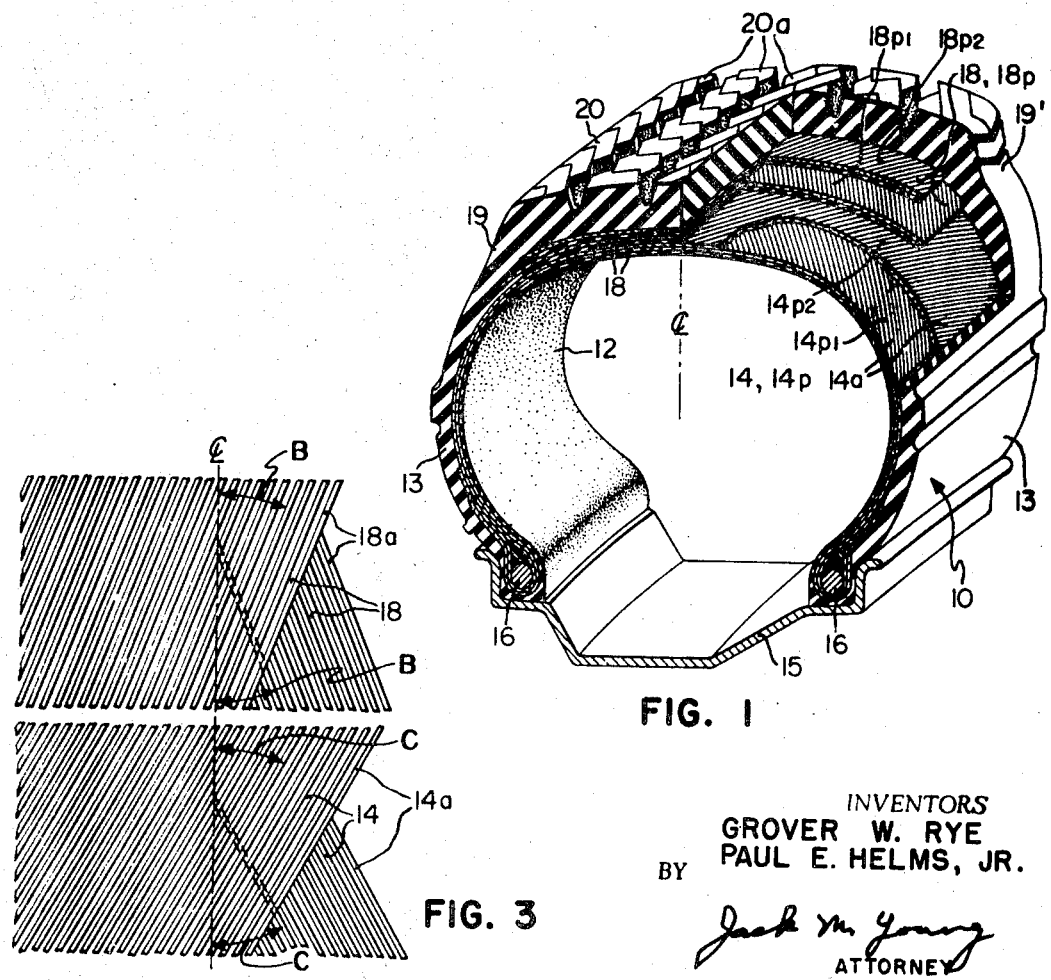
FIG. 3
FIG. 1
*INVENTORS*
GROVER W. RYE
PAUL E. HELMS, JR.
BY
*Jack M. Young*
ATTORNEY

BELT FOR BIAS-BELTED TIRE

The foregoing abstract is not to be taken as limiting the invention of this application, and in order to understand the full nature and extent of the technical disclosure of this application, reference must be made to the accompanying drawings and the following detailed description.

BACKGROUND AND SUMMARY OF THE INVENTION

The present invention relates to pneumatic tires, and to woven fabric usable as a ply in such tire; and relates especially to bias-belted tires.

A description of the prior art bias angle tires and radial ply tires as they relate to the presently disclosed bias-belted tires has been made in detail in the "Detailed Description of the Preferred Embodiments" hereinafter so that the development of the tire art may be more readily understood by reference to similar components in the drawing by reference numbers.

This invention obtains a superior quality pneumatic tire in a bias-belted tire by combining the desirable features of a bias angle tire and a radial ply tire.

An object of the present invention is to obtain a superior quality pneumatic tire by using a bias-belted tire construction.

Another object of the present invention is to provide a superior quality bias-belted tire having the herein specified tire belt cord physical characteristics of minimum, preferred and/or maximum belt weights.

Another object of the present invention is to provide a superior quality bias-belted tire with fiber glass belt cords, polyester carcass cords, and/or specified cord angles and relationships.

Another object of the present invention is to provide a superior quality pneumatic tire having a bias-belted construction with (1) excellent treadwear; (2) improved traction by keeping the tread grooves open; (3) excellent high speed performance and durability; (4) a cool running tire; (5) bruise resistance, ride, stability, handling, cornering, and road holding characteristics; (6) low rolling resistance; etc.

These and other objects of the present invention will become more fully apparent by reference to the appended claims as the following detailed description proceeds in reference to the accompanying drawings.

BRIEF DESCRIPTION OF THE DRAWINGS

In the drawings,

FIG. 1 is a perspective view of a cross section (with parts broken away) of a bias-belted tire of this invention mounted upon a rim and shown in its inflated position;

FIG. 2 is a radial, cross-sectional view (with parts broken away) of the tire of the present invention removed from the rim; and FIG. 3 is a radially inward view taken generally along the line 3-3 of FIG. 2 showing the relationship of the cord angles in the carcass and belt.

DETAILED DESCRIPTION OF THE PREFERRED EMBODIMENTS

In FIG. 1, bias-belted pneumatic tire 10 includes internally reinforced carcass 12 including carcass cord layer 14 having a plurality of carcass plies 14p (here shown as two in number as plies 14p1 and 14p2), which plies are wrapped around inextensible bead members 16 located at wheel rim 15 during use of the tire; and includes circumferential belt 18, comprising a plurality of circumferential belt or breaker plies 18p in carcass 12 beneath tread 20.

Each ply 14p or 18p is made of a rubberized fabric composed respectively of a plurality of parallel tire cords 14a or 18a disposed side-by-side to form the tire fabric, and coated on each side with a thin layer of rubber carcass stock.

Carcass plies 14p are so arranged that generally parallel carcass cords 14a connect, and extend from, one bead 16 of tire 10 to the other spaced-apart bead 16 with cords 14a of respective plies 14p crossed and extending in opposite directions.

A plurality of superimposed breaker or belt plies 18p, bias cut with belt cords 18a of adjacent plies crossed, are positioned in the crown of tire 10, circumferentially around carcass plies 14p, bisected by tire centerline CL, and beneath ground-engaging tire tread 20 having thereon suitable tread elements 20a, such as a pattern of grooves, ridges, etc.

After receiving shaped carcass 12 and applied belt 18 and tread 20 on a tire-building machine, tire 10 is cured in a mold in the usual manner. Then, finished bias-belted tire 10 in FIGS. 1 and 2 has carcass 12 with sidewalls 13, bead members 16, shoulders 19 and 19', and tread 20.

Cords 14a and 18a may be made of any suitable filamentary material. For example, cords 14a and 18a of plies 14p and 18p may be made of a synthetic textile material, such as rayon, nylon or polyester. Also, cords 18a in plies 18p may be made of any of the last mentioned synthetic materials; any suitable high modulus and relatively inextensible material, such as metallic wire, such as steel wire, or (nonmetallic) fiber glass; or any combination of any two or more of these materials such as in a merged cord.

Tire 10 has been found to have an especially desirable combination of advantages when carcass cords 14a are polyester material and cords 18a are a singles or other type cord of fiber glass filaments (nonmetallic filament) with each cord being formed of a plurality of extruded, continuous filaments, and especially when the hereinafter mentioned preferred cord angles are used.

The word "cord", as used herein, is used in the terminology of the tire trade when referring to carcass cords 14a, belt cords 18a, cord angle B or C, and cord or cords generically; and the word "cord" thus used is intended to include: (1) in the terminology of the textile trade plied yarn; singles yarn with "O", low, medium, or high twist; a cord or cable made of twisted or plied yarns; etc., and (2) in the terminology of the metal trade wire filament, cord, cable, etc. For example, polyester carcass cords 14a are usually true textile cords, while fiber glass belt cords 18a generally take the form of singles yarn or plied yarn with "O" or low twist so as to take maximum advantage of the characteristics of fiber glass filaments.

A superior quality tire, here called and described as bias-belted tire 10, is obtained by combining the desirable features of a bias angle tire and a radial ply tire.

A bias angle tire has multiple carcass plies of parallel cords placed as opposed angles, and symmetrical with the tire centerline with each ply extending from bead-to-bead through the carcass under the tire tread. These are similar to only two bias carcass plies 14p (with belt 18 omitted) under tread 20 in tire 10 in FIG. 1. This bias angle tire deflects under load in the tire footprint area to behave as a flexible membrane and to assume a smaller radius there as deflected under load with the result that in the footprint area the plies shorten and the cord angles in the plies change. This action also occurs in the tire sidewall and is called pantographing. Pantographing is desirable in the tire sidewall since it gives an improved ride by providing bump and vibration damping properties; but is not desirable in the tread since it distorts the thread elements, wears off tread by a rubbing action with the road, and increases temperature buildup.

A radial ply tire has one or move carcass plies going substantially radially from bead-to-bead with a belt of multiple plies of parallel cords banding the carcass under the tire tread. This belt is similar to belt 18 (without carcass plies 14p) in tire 10 in FIG. 1. This radial ply tire can be visualized as the belt acting like a fixed circumference steel band rolling on the pavement. Its circumference would be the same whether it is circular or is deformed into elliptical or semielliptical shape. Thus, the revolutions per mile are relatively independent of load or inflation pressure. Since the tread area will not pantograph, the fixed circumference hoop (belt) of a radial ply tire gives tread stability resulting an improved traction and tread wear. The sidewalls of a radial ply tire will not pantograph due to its carcass configuration.

Bias-belted tire 10 combines the flexible membrane and fixed circumference hoop type of operation, i.e., maintaining pantographing in the sidewall and eliminating pantographing in the tread. Principles involved in constructing such a tire can be divided into (a) necessary components and (b) degree of restriction. The components to achieve this desired combination necessitates the use of bias angle carcass 12 and belt 18. Bias angle carcass 12 permits pantographing action in the sidewalls 13 to give a good ride by effective vibration and bump damping, and to give sidewall strength and stability. Belt 18 provides an inextensible and incompressible hoop structure which stabilizes or stiffens tread 20 by minimizing pantographing in the tread area to minimize tread element 20a movement and squirm so as to obtain (1) excellent treadwear; (2) improved traction by keeping the tread grooves 20a open; (3) excellent high speed performance and durability; (4) a cool running tire; (5) good bruise resistance, ride, stability, handling, cornering, and road holding characteristics; and (6) low rolling resistance; etc.

The degree of restriction in tire 10 controls the behavior of the tire components. The degree of restriction is dependent on inflated tire characteristics, the relationship of components, and the materials of construction.

As to the inflated tire characteristics, when the tire is inflated to a normal operating pressure, belt 18 will provide a substantial restraint on the carcass 12. This restraint is with respect to the increase, as tire 10 is inflated, of the radial dimensions of carcass 12 as measured at circumferential centerline CL thereof and over a substantial area of carcass 12, extending from centerline CL and laterally of tire tread 20. In other words, if tire 10 were manufactured identically in all respects to bias-belted tire 10, but without belt 18, carcass 12 of such tire would, when the tire was inflated, increase in such radial dimensions by amounts substantially greater than would carcass 12 of tire 10 having belt 18. It will be apparent that in bias-belted tire 10 belt 18 will be required to carry a very substantial portion of the ring stresses present in inflated tire 10.

The relationship of the tire components is primarily characterized by carcass cord angle C, belt cord angle B and the differential of these angles. Cord angles B and C are measured relative to the equatorial plane containing centerline CL, or relative to this centerline CL. Carcass cord 14a angle C in each carcass ply 14p should be maintained between 25° and 45° and belt cord 18a angle B in each belt ply 18p between 5° and 35° with belt cord 18a angle B even being desirably limited to be between 10° and 30°. In addition, angle C of carcass cords 14a should be at least 5° greater than belt angle B of belt 18. The preferred angle C of carcass cords 14a is 28°—40° and the preferred belt cord angle B of belt 18 is 18°—28°. As to belt 18, under 5° belt cord angle B makes a tire difficult to manufacture; under 18° belt cord angle B, the tire is difficult to manufacture for other reasons; and a 18°—25° belt cord angle B gives good tire performance, good tread wear, and high separation resistance. The reason for having belt cord angle B lower than carcass cord angle C is to get belt 18 to act as a restrictor on both carcass 12 and tread 20. The natural tendency of the tire is to form a tire shape coordinate with the cord path. The belt cord angle must be less than the carcass cord angle because, as the cord angle goes down, the tire has a flatter tread so belt 18 acts as a restrictor for the crown of tire carcass 12 if belt 18 has a lower cord angle than the rounder shape carcass 12 having higher cord angle C. If belt cord angle B exceeds 35°, the belt 18 is too round in the tire crown under tread 20 and provides insufficient restriction; belt 18 then becomes round like carcass 12 instead of flat like tread 10 so as not to provide the desired restriction. It should be apparent from FIG. 3 that belt cords 18a in adjacent belt plies 18p1 and 18p2 have different cord angles B relative to centerline CL and are oppositely and symmetrically inclined relative to centerline CL. Also, carcass cord 14a angle C in adjacent carcass plies 14p1 and 14p2 are also oppositely and symmetrically inclined relative to tire centerline CL.

The drawings specifically disclose two carcass plies 14p1 and 14p2, hereinafter generically referred to as belt plies 18p: and carcass plies 14p superimposed on each other and surrounded by two superimposed belt plies 18p in bias-belted tire 10. However, it should be readily apparent that this invention relates to all types of bias-belted tires, even though only bias-belted tire 10 is illustrated and described herein as an example. Therefore, when bias-belted tire 10 is referred to herein, the description and drawings are intended to include within their scope all operative variations of the illustrated structure including: (1) in carcass cord layer 14, any suitable number of carcass plies 14p; and (2) in belt 18, any suitable number of belt plies 18p, such as one, two (as shown), three or more belt plies 18p; any number of belt plies 18p arranged above (outside) the carcass plies 14p as shown, or arranged below, between, some between and some above or some below, or sandwiched around (above and below) carcass plies 14p. However, the illustrated two carcass ply 14p and two belt ply 18p construction in bias-belted tire 10 is the preferred construction herein.

Polyester carcass cords 14a and fiber glass belt cords 18a are preferred in bias-belted tire 10 for numerous reasons. Polyester is preferred: (1) over nylon for its high speed impact resistance, better uniformity and stability, low noise level and good tread wear and damping, and no flatspotting; and (2) over rayon for its better strength, uniformity, and durability; softer ride; lower rolling resistance; and better high speed and fatigue characteristics. Fiber glass is a preferred belt cord because of its high impact strength, compression modulus and stiffness; very high dynamic modulus; and low growth and creep.

The degree of restriction and the strength and success of bias-belted tire 10 is dependent on the materials of belt construction, namely the type and quantity (or weight) of belt cords 18a used, which will be emphasized hereinafter. If the quantity of material in belt cords 18a is not sufficient, belt 18 will not properly restrict tire 10 to provide true bias-belted tire performance characteristics. Insufficient belt material yields tire performance characteristics more closely associated with that of a bias angle tire; and may under certain conditions, such as at high speed and with inadequate belt cord 18a in belt 18 permit the centrifugal force to overcome the strength of belt cords 18a to lead to tire cord rupture. If too much belt cord material is provided, the effective gauge is increased not only of the belt cords but also of the rubber compound thereon so that there is a possibility of separation of belt cords and their rubber skim, calender or belt ply coat compound.

First, there will be developed a universal formula useable for any type belt cords 18a (whether all cord be made of the same fiber or each cord be made of two or more merged different fibers, such as merged fiber glass and nylon, based on the tenacity of the uncoated belt cord 18a twisted to the specified amount and ready for assembly into a tire but prior to the final cord coating with rubber compound, hereinafter called "untreated cord." Second, there will be derived a universal formula useable for all cord materials, and then a formula directed solely to the preferred fiber glass material for belt cords 18a.

The universal formula for designing belt cords 18a is based on the assumption that belt 18 in tire 10 is the sole structural member, at least in the tire crown area, that takes the entire tire load. This universal formula is expressed as:

$$W = \frac{\pi D^2 \times T_w \times P \times F_s}{2T}$$

wherein the above factors are defined as follows with the measurement quantities of each given in parenthesis hereinafter:

W = weight of untreated belt cord 18a material, (lbs.).
T = tenacity of untreated belt cord 18a, (lbs. force-inches/lb. mass).
$F_s$ = safety factor, (nondimensional scaling factor). A workable safety factor is in the range of 4—11 with 7 being the preferred factor of safety.

D = outside diameter of tire 10 after inflation, (inches).
$T_w$ = width of tire tread 20, (inches).
P = maximum allowable inflation pressure, (lbs. per sq. in.).

This is the derivation of this formula. Since the stress is considered as a hoop stress, the stress in the tire crown is:

$$\text{Hoop stress} = \frac{D}{2} \times P$$

Also, the:

$$\text{Weight of belt cord} = \frac{\text{Hoop stress} \times \text{hoop width} \times \text{hoop length} \times F_s}{\text{Tenacity of belt cord}}$$

If we assume that the hoop width = tread width and that the diameter D of tire 10 is approximately the mean hoop diameter, then:

$$W = \frac{\left[\frac{D \times P}{2}\right] \times T_w \times (\pi D) \times F_s}{T}$$

or $$W = \frac{\pi D^2 T_w P F_s}{2T}$$

The workable factor of safety in the preceding and following formulas is obtained by taking the normal factor of safety and dividing by the cosine of angle B (the cord angle of belt cords 18a) because these cords vary by this angle from the circumferential hoop configuration so the cords take not only the hoop stress but also an axial component.

This formula may be used to calculate the weight W of fiber glass in belt cords 18a in two typical tires $T_1$ and $T_2$ as follows:

$$W = \frac{\pi D^2 \times T_w \times P \times F_s}{2T}$$

For tire $T_1$:

$$W = \frac{3.14 \times (26.54)^2 \times (5.78)(32)(7)}{2 \times 2.92 \times 10^6}$$

$W = 0.4903$ lb. for $F_s = 7$
$W = 0.28$ lb. for $F_s = 4$
$W = 0.77$ lb. for $F_s = 11$ For tire $T_2$:

$$W = \frac{3.14 \times (28.14)^2 \times (7.19)(32)(7)}{2 \times 2.92 \times 10^6}$$

$W = 0.6857$ lb. for $F_s = 7$
$W = 0.392$ lb. for $F_s = 4$
$W = 1.18$ lbs. for $F_s = 11$ This is another formula especially adapted for use with preferred fiber glass belt cords 18a. When tire 10 has belt 18 composed solely of fiber glass cords 18a, the preferred weight of fiber glass in the belt is given by the following equation:

$$W = K \times T_w \times D \times \frac{P}{28}$$

wherein the above factors are defined as follows with measurement quantities of each being given in parentheses hereafter;

W = Weight of fiber glass cord 18a in tire belt 18, (lbs.).
$T_w$ = Width of tire tread 20, (inches).
D = Outside diameter of tire 20 after inflation (inches).
P = Maximum allowable inflation pressure of tire 10, (lbs. per sq. in.).
K = Composite constant, (dimensionless).

It has been found that satisfactory or superior tires having the qualities desired are obtained wherein the value of K is selected from 0.0015 to 0.0050 establishing, respectively, the minimum and maximum weight of fiber glass to be used in belt 18. The optimum or preferred K = 0.0031.

If K in this last formula or the safety factor Fs in any of these formulas is below the specified minimum, the amount of fiber glass or other cord material in cords 18a of belt 18 is not sufficient to properly restrict the tire for bias-belted tire performance; while if K or the safety factor Fs is above the maximum value given, there is a possibility of separation of the fiber glass yarn or other belt cord material from its rubber skim, calender or ply coat compound.

K in the last equation is a function of several physical characteristics of the fiber glass in the belt, this may be expressed as:

$$K \approx \frac{d \times G \times D_p \times F_s}{Q}$$

wherein the above factors are defined as follows with measurement quantities of each being given in parenthesis hereinafter:

$\approx$ = approximately equal.
d = density of the fiber glass in belt cord 18a, (lbs. per cubic inch).
G = total gauge of the fiber glass belt cord obtained by multiplying the number of belt plies 18p of belt 18 (here shown as two plies in the drawings) times the gauge of fiber glass belt cord 18a used, (inches).
$D_p$ = effective packing density, (dimensionless). This is a function of the amount of fiber glass, versus the amount of rubber, or rubber impregnant, and the type of fabric weave in each belt ply 18p.
$F_s$ = safety factor, (nondimensional scaling factor).
Q = cord efficiency for transmitting stress, (nondimensional scaling factor) defined as equal to:

$$\frac{\text{Young's modulus of the belt cord 18a, (lbs. per sq. in.)}}{\text{Breaking tensile strength of the belt cord 18a, (lbs. per sq. in.)}}$$

Hence, $D_p \times G$ will give the dimensions of an equivalent thin glass sheet.

The optimum value of K for fiber glass can be calculated by substituting these values in the above equation:

$$K \approx \frac{0.0915 \times (2 \times 0.025) \times 0.67 \times 7}{\frac{10.7 \times 10^6}{1.5 \times 10^6}}$$

$K = 0.00310$

The last mentioned formula for the weight W of fiber glass may be used to calculate the weight of fiber glass in the same two typical tires $T_1$ and $T_2$, as follows:

$$W = K \times T_w \times D \times \frac{P}{28}$$

For tire $T_1$:

$$T_w \times D \times \frac{P}{28} = 26.54 \times 5.78 \frac{32}{28} = 174.9$$

and
$W = 0.262$ lb. for $K = 0.0015$
$W = 0.542$ lb. for $K = 0.0031$
$W = 0.875$ lb. for $K = 0.005$ For tire $T_2$:

$$T_w \times D \times \frac{P}{28} = 28.14 \times 7.19 \times \frac{32}{28} = 202.3$$

and
$W = 0.303$ lb. for $K = 0.0015$
$W = 0.627$ lb. for $K = 0.0031$
$W = 1.012$ lbs. for $K = 0.005$.

Passenger tires can range in diameter D from 18 to 36 inches and in tread with $T_w$ from 3½ to 12 inches to give considerable variation in the weight W for the range of different size tires.

This invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are, therefore, intended to be embraced therein.

We claim:

1. A bias-belted tire, comprising:
spaced tire beads;
a carcass connecting said beads;
a ground engaging tread on said carcass;
said carcass including at least two bias plies extending from bead to bead;
a circumferential belt in said carcass beneath said tread;
said belt comprising a plurality of superimposed belt plies;
each belt ply having substantially parallel belt cords each defining a belt cord angle relative to the centerline of the tire;
The cords in adjacent belt plies having different cord angles relative to the tire centerline;
the weight of the untreated belt cords in said belt being approximately:

$$\frac{\pi D^2 \times T_w \times P \times F_s}{2T}$$

wherein:
$F_s$ = safety factor
$T$ = tenacity of the untreated belt cords
$T_w$ = width of tire tread
$D$ = outside diameter of tire
$P$ = maximum allowable inflation pressure of the tire.

2. A bias-belted tire, as set forth in claim 1, with $F_s$ being approximately 7.

3. A bias-belted tire, as set forth in claim 2, with said belt cords comprising continuous filament fiber glass.

4. A bias-belted tire, as set forth in claim 1, with $F_s$ being approximately 4 to 11.

5. A bias-belted tire, as set forth in claim 4, with said belt cords comprising continuous filament fiber glass.

6. A bias-belted tire, as set forth in claim 4, with:
each of said bias plies having generally parallel carcass cords of polyester,
each of said belt plies having generally parallel belt cords comprising fiber glass filaments.

7. A bias-belted tire, as set forth in claim 4, with:
the carcass cord angle being in adjacent carcass plies oppositely and symmetrically inclined relative to the tire centerline;
the belt cord angle being in adjacent belt plies oppositely and symmetrically inclined relative to the tire centerline;
the carcass cord angle being at least 5° greater than the belt cord angle.

8. A bias-belted tire, as set forth in claim 7, with said belt cord angle being between 5° and 36°.

9. A bias-belted tire, as set forth in claim 7, with said belt cord angle being between 10° and 30°.

10. A bias-belted tire, as set forth in claim 7, with said belt cord angle being between 18° and 28°.

11. A bias-belted tire, as set forth in claim 7, with said carcass cord angle being between 25° and 45°.

12. A bias-belted tire, as set forth in claim 11, with said belt cord angle being between 18° and 28°.

13. A bias-belted tire, as set forth in claim 12, with:
each of said bias plies having generally parallel carcass cords of polyester filaments,
each of said belt plies having generally parallel belt cords comprising fiber glass filaments.

14. A bias-belted tire, comprising:
spaced tire beads;
a carcass connecting said beads;
a ground engaging tread on said carcass;
said carcass including at least two bias plies extending from bead to bead;
a circumferential belt in said carcass beneath said tread;
said belt comprising a plurality of superimposed belt plies;
each belt ply having substantially parallel fiber glass belt cords each defining a belt cord angle relative to the centerline of the tire;
the cords in adjacent belt plies having different cord angles relative to the tire centerline; and
the weight fiber glass belt cords in said belt being approximately:

$$K \times T_w \times D \times \frac{P}{28}$$

wherein:
$T_w$ = width of tire tread
$D$ = outside diameter of tire tread
$P$ = maximum allowable inflation pressure of the tire
$K$ = composite constant.

15. A bias-belted tire, as set forth in claim 14, with $$K \approx \frac{d \times G \times D_p \times F_s}{Q}$$

wherein:
$d$ = density of the fiber glass
$G$ = total gauge of the fiber glass obtained by multiplying the number of belt plies times the gauge of the fiber glass belt cord:
$D_p$ = effective packing density
$F_s$ = safety factor
$Q$ = cord efficiency for transmitting stress defined as equal to:

$$\frac{\text{Young's modulus of the belt cord}}{\text{Breaking tensile strength of the belt cord}}$$

16. A bias-belted tire, as set forth in claim 14, with said $K = 0.0031$.

17. A bias-belted tire, as set forth in claim 14, with said $K$ = between 0.0015 and 0.005.

A bias-belted tire, as set forth in claim 14, with:
each of said bias plies having generally parallel carcass cords of polyester; and
each of said belt plies having generally parallel belt cords comprising fiber glass filaments.

19. A bias-belted tire, as set forth in claim 14, with:
the carcass cord angle being adjacent carcass plies oppositely and symmetrically inclined relative to the tire centerline;
the belt cord angle being in adjacent belt plies oppositely and symmetrically inclined relative to the tire centerline; and
the carcass cord angle being at least 5° greater than the belt cord angle.

20. A bias-belted tire, as set forth in claim 19, with said belt cord angle being between 5° and 35°.

21. A bias-belted tire, as set forth in claim 19, with said belt cord angle being between 10° and 30°.

22. A bias-belted tire, as set forth in claim 19, with said belt cord angle being between 18° and 28°.

23. A bias-belted tire, as set forth in claim 19, with said carcass cord angled being between 25° and 45°.

24. A bias-belted tire, as set forth in claim 23, with said belt cord angle being between 18° and 28°.

25. A bias-belted tire, as set forth in claim 24, with:

each of said bias plies having generally parallel carcass cords of polyester filaments; and each of said belt plies having generally parallel belt cords comprising fiber glass filaments.

UNITED STATES PATENT OFFICE
CERTIFICATE OF CORRECTION

Patent No. 3,548,911   Dated December 22, 1970

Inventor(s) Grover W Rye and Paul E Helms, Jr

It is certified that error appears in the above-identified patent and that said Letters Patent are hereby corrected as shown below:

In the specification: column 2, line 46, "as" should read -- at --; column 2, line 62, "move" should read -- more --; column 2, line 73, "an" should read -- in --.

In the claims:   Claim 8, line 2, "36°" should read -- 35°-

Signed and sealed this 11th day of May 1971.

(SEAL)
Attest:

EDWARD M. FLETCHER, JR.
Attesting Officer

WILLIAM E. SCHUYLER, JR.
Commissioner of Patents